June 17, 1930.  W. W. LASKER  1,764,735
PIN BOX SELECTIVE MECHANISM FOR ACCOUNTING MACHINES
Original Filed Oct. 31, 1923   7 Sheets-Sheet 1
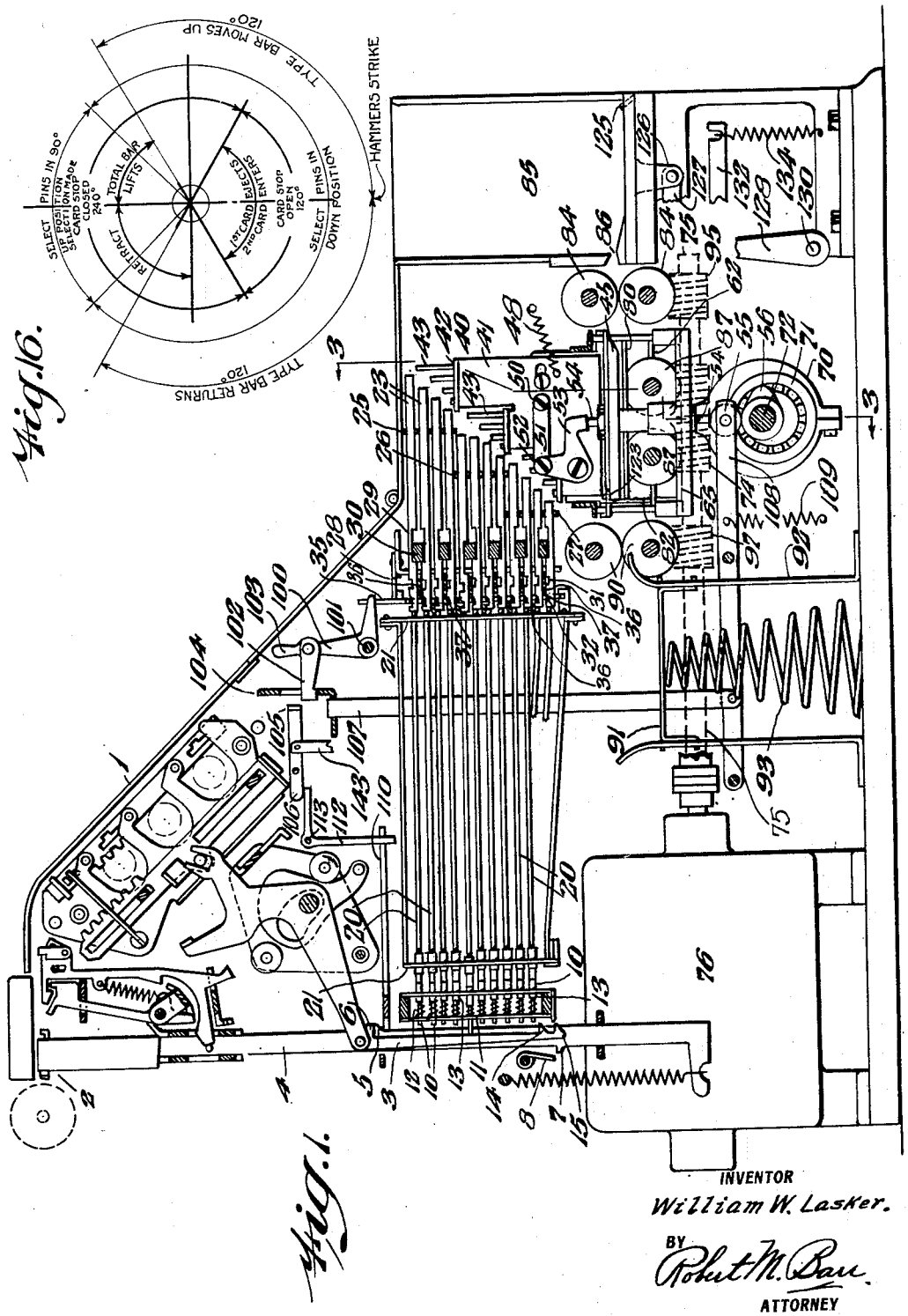
INVENTOR
*William W. Lasker.*
BY
*Robert M. Barr*
ATTORNEY

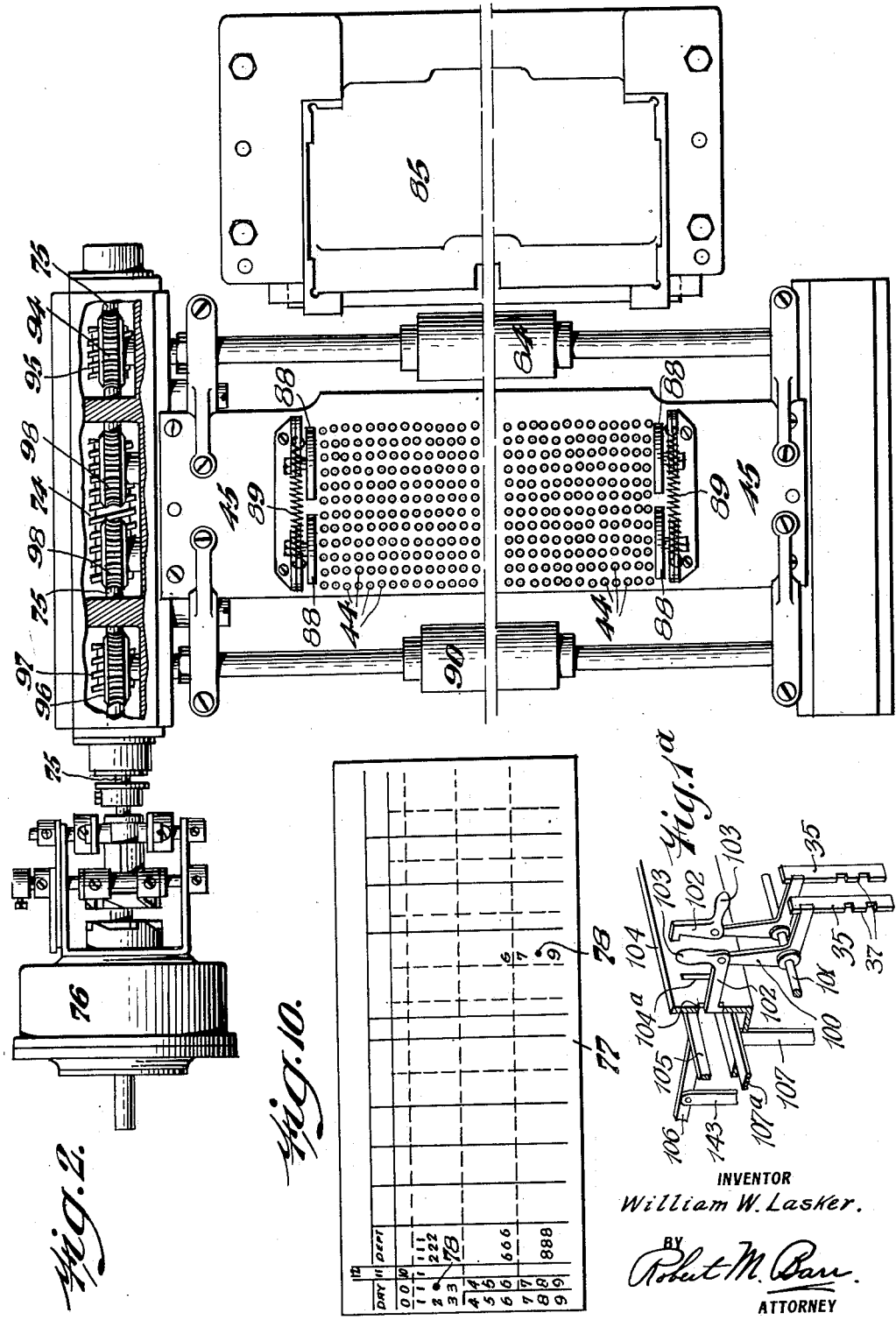

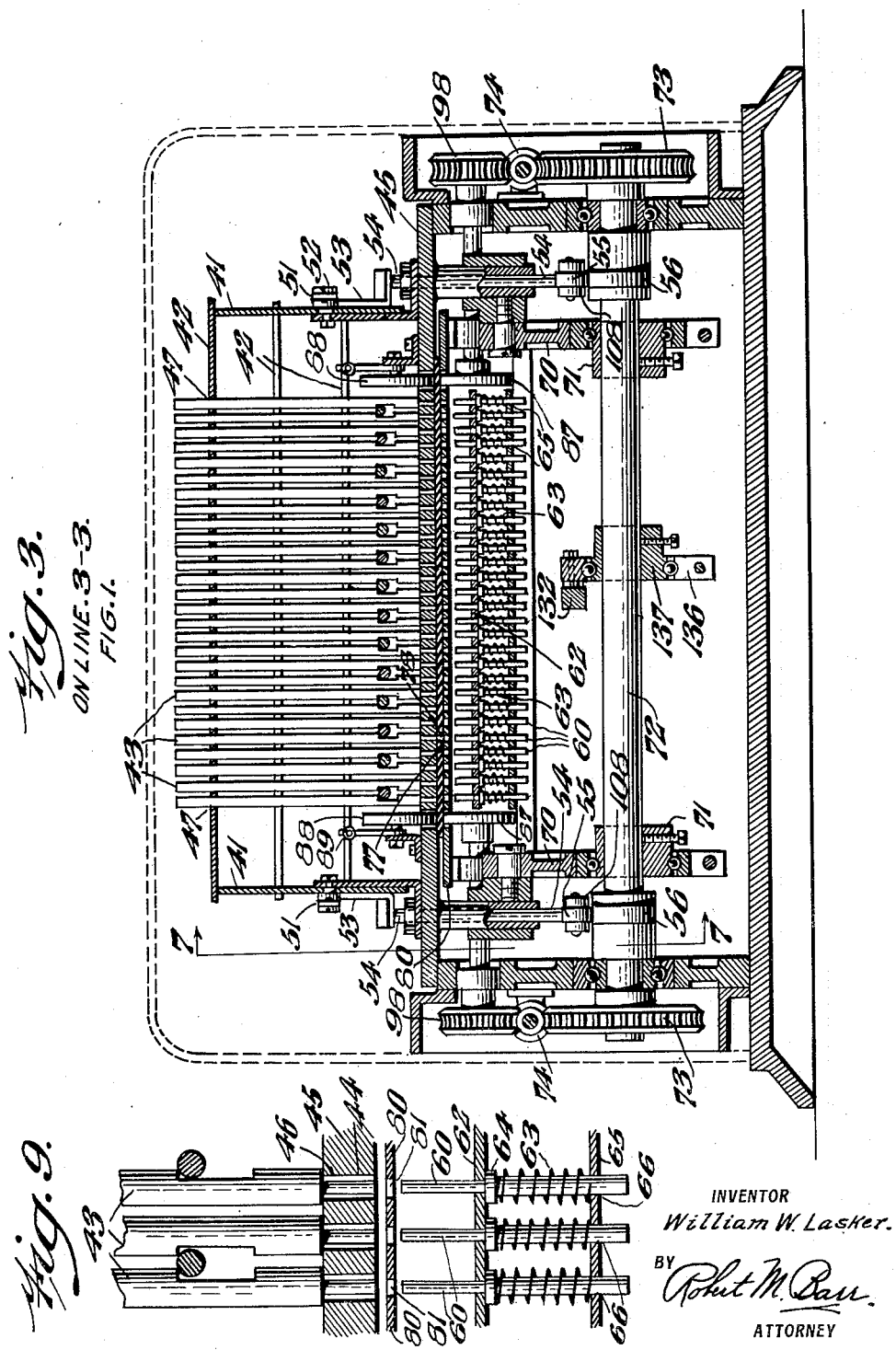

June 17, 1930.   W. W. LASKER   1,764,735
PIN BOX SELECTIVE MECHANISM FOR ACCOUNTING MACHINES
Original Filed Oct. 31, 1923    7 Sheets-Sheet 4
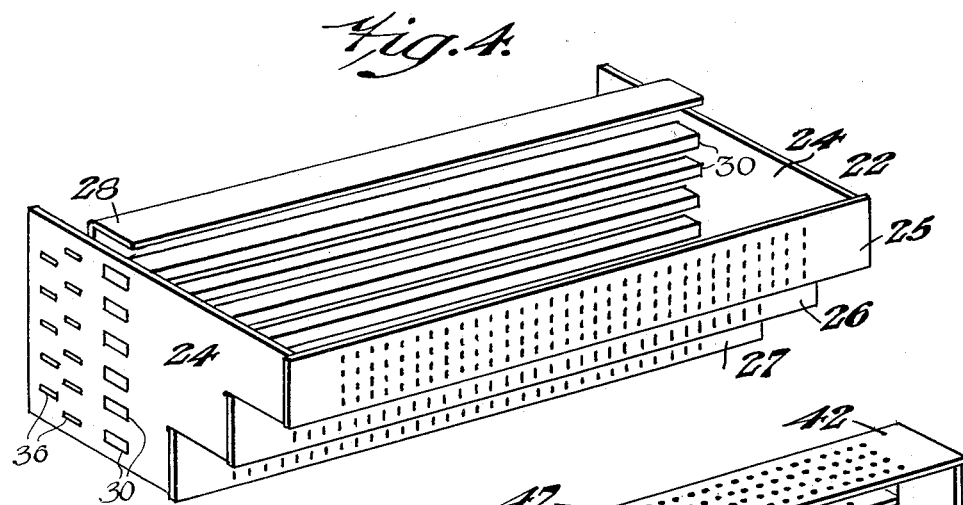
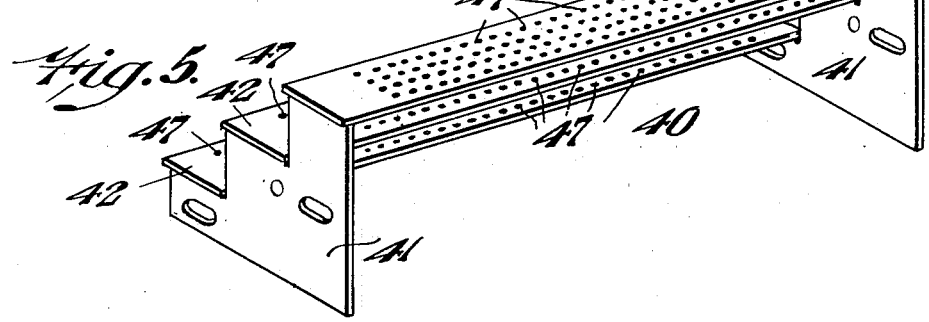
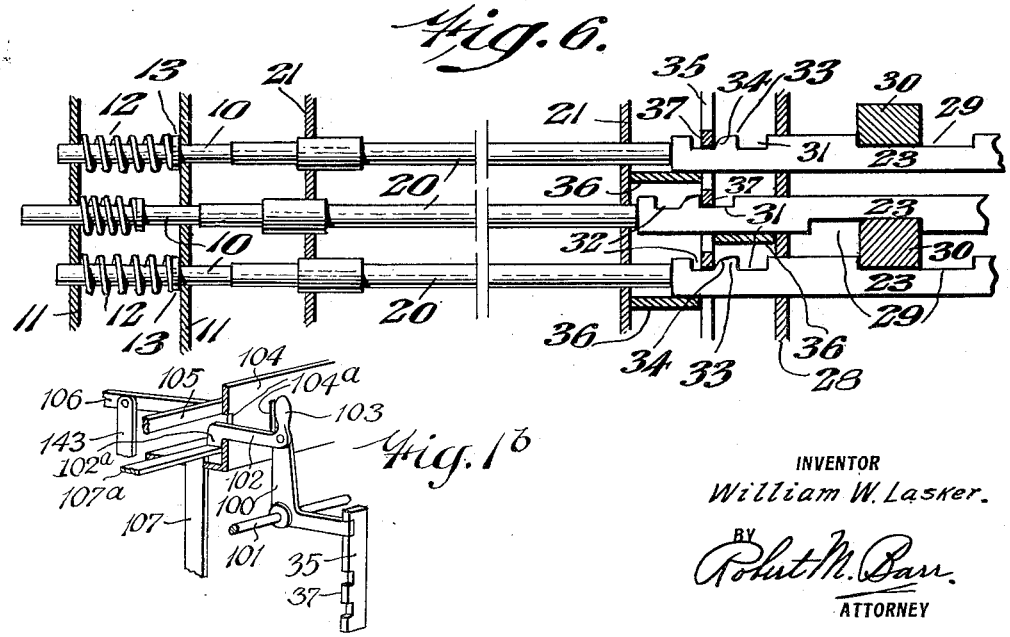
INVENTOR
William W. Lasker.
BY
Robert M. Barr
ATTORNEY

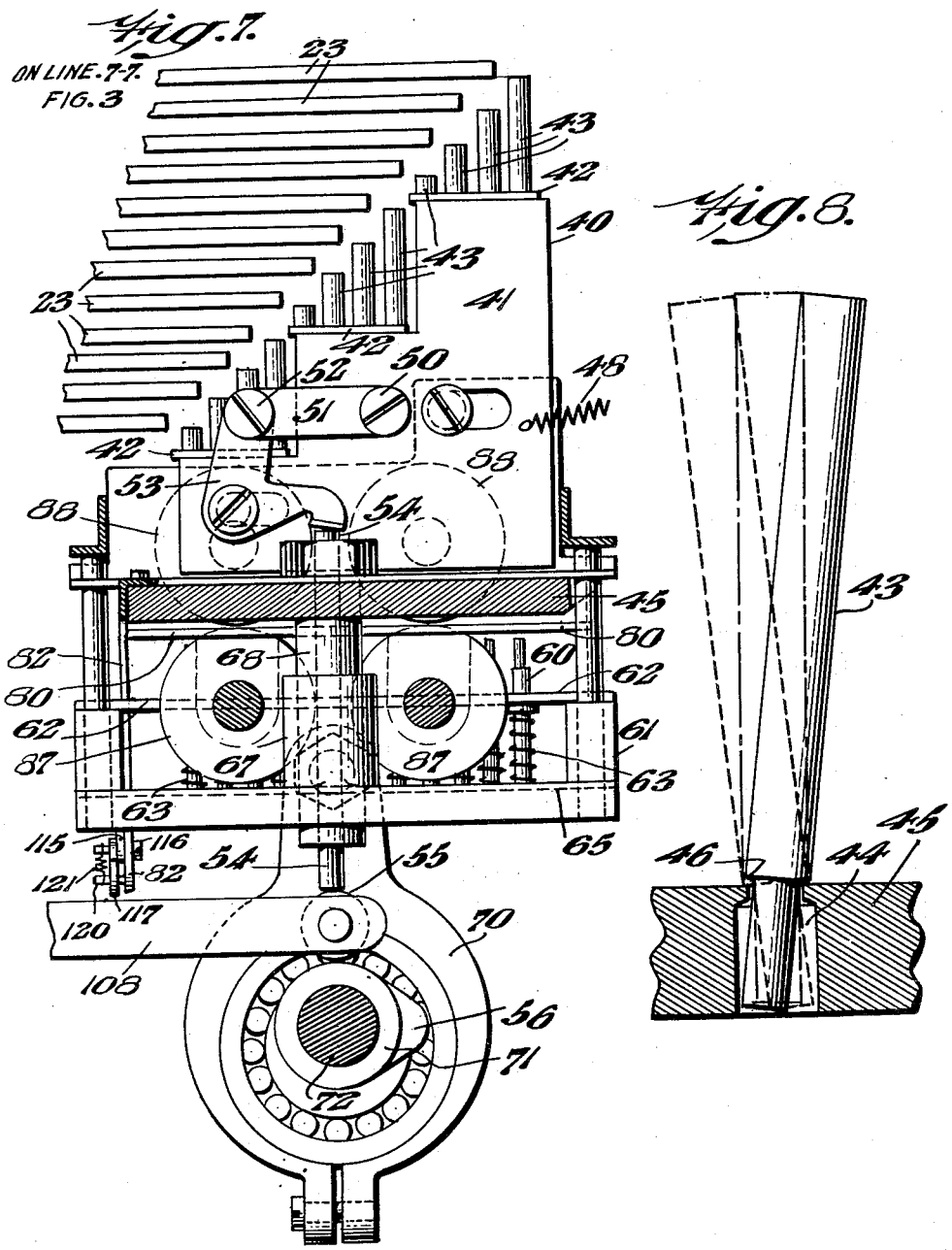

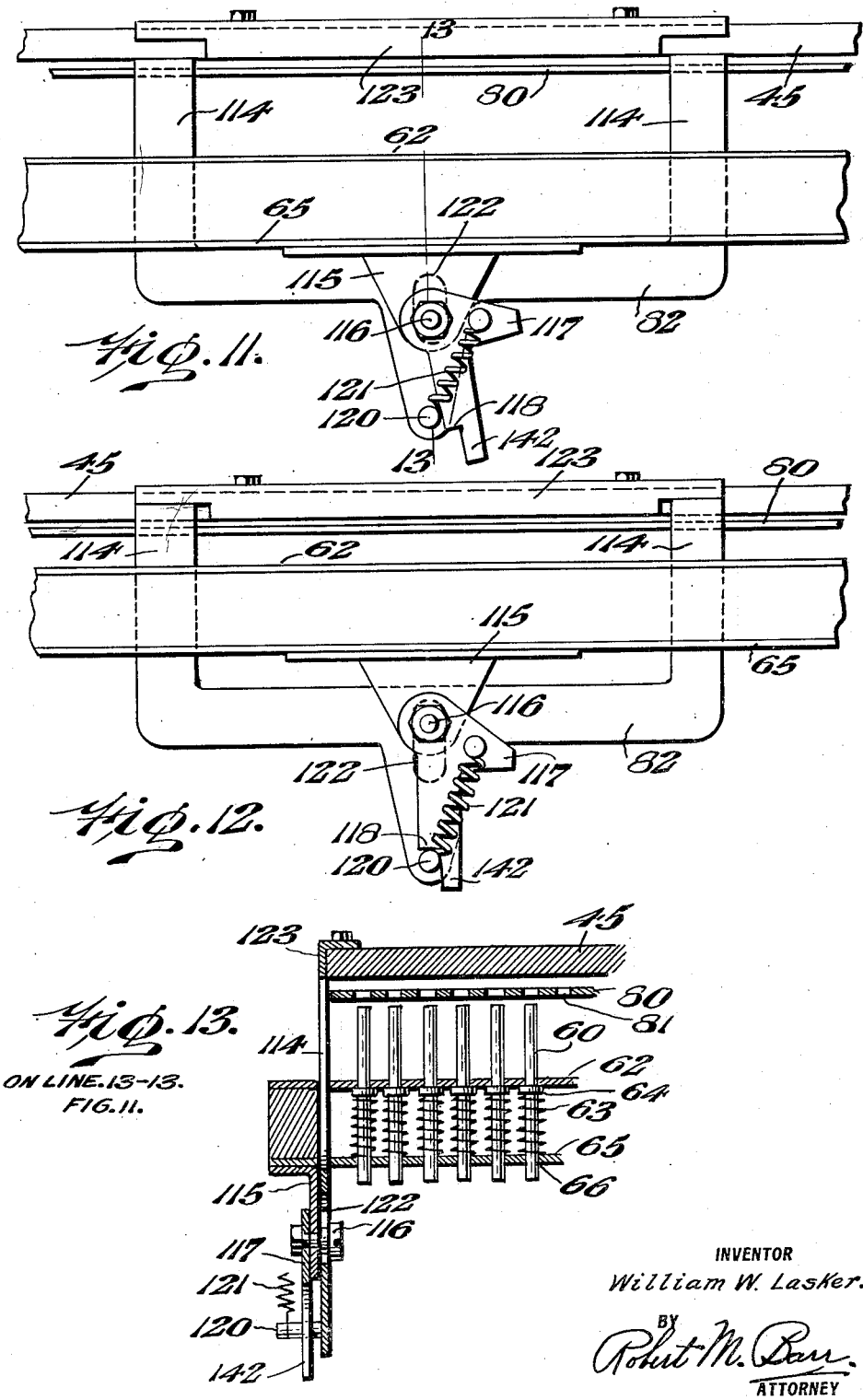

June 17, 1930.   W. W. LASKER   1,764,735
PIN BOX SELECTIVE MECHANISM FOR ACCOUNTING MACHINES
Original Filed Oct. 31, 1923   7 Sheets-Sheet 7
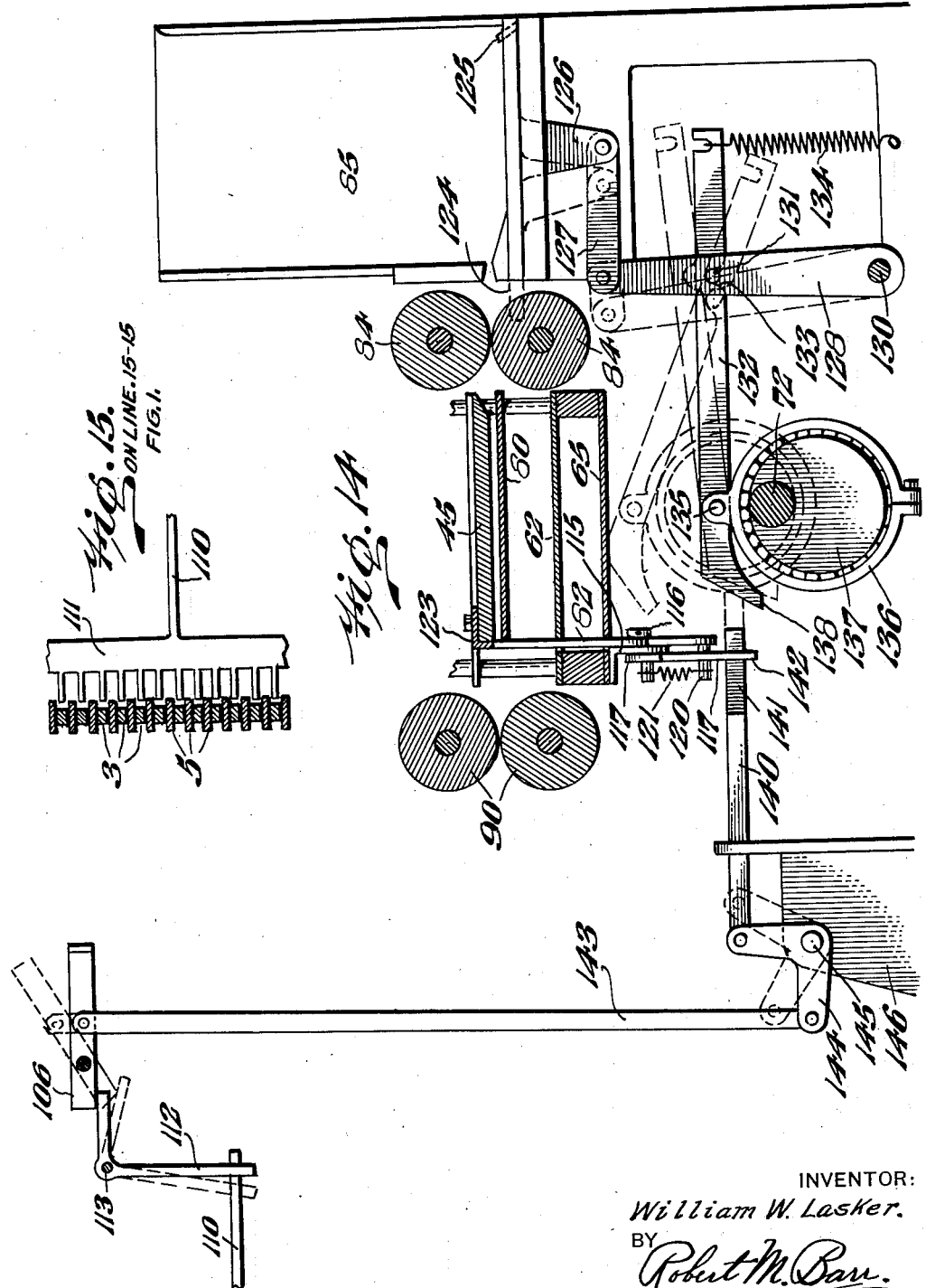
INVENTOR:
William W. Lasker.
BY
Robert M. Barr.
ATTORNEYS.

Patented June 17, 1930

1,764,735

UNITED STATES PATENT OFFICE

WILLIAM W. LASKER, OF BROOKLYN, NEW YORK, ASSIGNOR, BY MESNE ASSIGNMENTS, TO REMINGTON-RAND INC., OF NEW YORK, N. Y., A CORPORATION OF DELAWARE

PIN-BOX SELECTIVE MECHANISM FOR ACCOUNTING MACHINES

Application filed October 31, 1923, Serial No. 671,891. Renewed April 12, 1930.

The present invention relates generally to accounting or tabular printing machines of the type controlled and operated by a pin-box selecting mechanism functioning in accordance with perforated cards punched in a predetermined manner to correspond to the data to be compiled and tabulated.

Some of the objects of the present invention are to provide an improved automatic selecting means for accounting machines; to provide means whereby a greater number of cards can be passed through an accounting machine in a given time than has heretofore been possible and a more rapid compilation of the card data obtained; to provide a continuously operable card operated pin selecting mechanism; to provide a card operating pin selecting mechanism which is arranged to perform a second pin selecting operation with another card while the accounting and printing cycle of a prior card is being completed; to provide a simple and positive latch pin setting operating; to provide an improved pin actuating means for latch bars of a selecting mechanism including a tilting pin construction; to provide an improved key designating mechanism whereby all cards with a predetermined key number have their data automatically totalled; to provide a key designating mechanism which automatically causes a total to be struck by the accounting section in case a card of a different key number enters the machine; to provide means for rendering the pin selecting and the card feeding mechanism ineffective during the actuation of the totaling mechanism; and to provide other improvements as will hereinafter appear.

In the accompanying drawings, Fig. 1 represents an elevation in part section of one form of automatic pin-box selecting mechanism embodying the present invention; Fig. 1 (a) represents a perspective detail of the latch construction with one latch set; Fig. 1 (b) represents the same with the latch shifted to operative position; Fig. 2 represents a plan of the pin-box and its associated parts; Fig. 3 represents a section on line 3—3 of Fig. 1; Fig. 4 represents a perspective of one form of latch bar cage employed; Fig. 5 represents a perspective of one form of pin selecting cage employed; Fig. 6 represents an enlarged detail of a portion of the selecting bar control; Fig. 7 represents a section on line 7—7 of Fig. 3; Fig. 8 represents a detail showing one way of supporting the selecting pins; Fig. 9 represents a sectional detail of the arrangement of selecting pins and pin-box pins; Fig. 10 represents one form of card from which the desired data is to be compiled; Fig. 11 represents a detailed elevation of one form of card stop mechanism in one position; Fig. 12 represents a similar detail of the card stop in another position; Fig. 13 represents a detailed section on line 13—13 of Fig. 11; Fig. 14 represents a detailed elevation in part section of the totaling control for the card stop and card feeding mechanism; and Fig. 15 represents a detailed section on line 15—15 of Fig. 1; Fig. 16 is an operation-time diagram.

Referring to the drawings, one form of the present invention in perforated card pin-box selecting mechanism is shown in conjunction with its associated parts, including generally an adding or accumulating mechanism 1 and a printing or tabulating mechanism 2, both of which may be of any well-known form of the type controlled by setting bars 3 and registering or printing bars 4. The printing bars 4 may be generally referred to as of the spring actuated type, and each has a lug 5 to engage a similar lug 6 on the setting bar 3, so that the printing bar is limited in its operating movement by the position of the setting bar 3, as will be understood. A lug 7 projects to one side of the bar 4 and is arranged to be engaged by a movable latch 8, which is preferably both manually and automatically operable. Thus, when it is desired to list every item of the data, the latch 8 is manually released, so that the selected data from every card will be automatically printed by the operation of the respective printing bars 4. When, however, only totals are to be struck, the latch 8 is moved to its locking position in engagement with the lug 7, and thus holds the printing bar out of engagement until such time as a total is to be struck, when the totaling mechanism operating through bars 3 automatically releases the latch 8, so that the bar is free to cause the machine to print the total. After a total has been printed and the machine is started on a new group of cards the latch 8 is automatically reengaged. While but one of the setting bars 3 is here shown, it will be understood that there are as many as are required for respectively actuating the calculating elements of the machine, to cause the printing mechanism to record the desired data. The bars 3 are of the type which are moved to certain predetermined positions under control of a selecting means, and each set position of each of the bars 3 determines the actuation of a certain predetermined digit or character of the calculating or data tabulating mechanism.

As a means for determining the several set positions of the respective setting bars 3, each is arranged to be under the control of a series of stop pins, and for facility of description one of the bars and its control adjuncts will be considered and described as a unit, with the understanding that all the other bars are parts of similar units. The bar 3 is arranged to move in transverse alinement with a row of stop pins 10, slidably mounted in a frame 11, and normally held in retracted position by coil springs 12 acting respectively between one plate of the frame 11 and shoulders 13 upon the respectice pins 10. Preferably, both ends of the stop pins 10 project from the frame 11, so that the pin ends juxtaposed to the bar 3 are in relatively close proximity thereto, and when any one of the pins 10 is moved axially against the spring pressure, it will unlock the bar 3 and be positioned in the path of movement of a latch lug 14 upon the bar 3, to thus limit the travel of the bar 3 in its typesetting operation. A second lug 15 projects from the bar 3, and serves to lock the bar normally in the naught position by engagement with an end of the frame 11, as will be seen in Fig. 1, and whenever the stop pin 10 is actuated, its movement is sufficient to remove this lug 15 from its locking position and release the bar 3 for cooperative action with the pin mechanism. As here shown, there are ten stop pins 10 arranged to coact separately with the same bar 3, this number being employed because the machine is of the calculating type and the pins represent respectively digits from naught to nine. Where more pins are required in the stop pin frame, in order to set the mechanism to record other data, such, for example, as the months of the year, or to print letters of the alphabet, it will of course be understood that such pins can be added without in any way changing or departing from the invention.

For the purpose of causing the stop pins 10 to be moved to their operating position in the path of the latch lug 14, a plurality of plungers 20, (Figs. 1 and 6), is provided, corresponding in number to the number of stop pins 10, and each of which is in register with a stop pin end projecting from the frame 11 on the side opposite to the bar 3. The plungers 20 are mounted for sliding movement in two rigidly connected perforated plates 21, which are so spaced as to allow the two ends of the respective plungers to project sufficiently for proper movement without becoming displaced. In operative position, the ends of the plungers 20, juxtaposed to the stop pins 10, are in contact with the respective stop pins 10 so that the retracting action of the stop pin springs 12 also causes retraction of the plungers 20. Preferably, this plunger structure is constructed as a removable unit so that substitution of other plunger units may be made when other operation or variation in the data is desired.

For operating the plungers 20, a cage 22 (Fig. 4), is provided, having a plurality of latch bars 23, (Figs. 1 and 6), mounted therein for sliding movement, there being as many latch bars 23 as there are plungers, and each arranged in normal or inoperative position, to have an end in abutting alined relation with the plunger which it controls or is to actuate. The latch cage 22 comprises side plates 24, (Fig. 4), and transverse plates 25, 26, 27 and 28, these latter being perforated to provide guide openings for the respective latch bars 23. Each of these latch bars 23 is recessed at a suitable point in one edge thereof, and the arrangement is such that each pair of superposed bars 23 has the recesses opening toward each other to thus form a substantially rectangular opening 29 to receive a rigid element 30, (Figs. 1, 4, and 6), which is fastened at its ends to the cage sides 24. The elements 30 fit snugly between the respective pairs of bars 23 but are of less width than the length of the respective openings in order to permit required movement of the bars to take place. The function of this element and recess construction is to prevent the latch bars from dropping out of the cage in case the latter is removed from the machine for any purpose.

In order to lock the latch bars 23, (Fig. 6) in either of two positions, each is provided in its upper edge with two locking notches 31 and 32 spaced by a lug 33 having a cam face 34 curving downward into the notch 32. A lock bar 35 is provided for each vertical set of latch bars 23 and is arranged to pass between the pairs of sets being confined against side movement by transverse rigid strips 36, fixed between the end plates 24, (Fig. 4), of the latch cage 22. These strips 36 in the present construction are located alternately at opposite sides of the lock bar 35, (Fig. 6), and each supports and guides one of the latch bars 23. The lock bar 35 is provided with a plurality of laterally projecting keepers 37, (Figs. 1, 1ª, 1ᵇ and 6), one for each latch bar 23, and in the normal or inoperative position of the latch bars 23 the respective keepers 37 seat in the locking notches 32. When a latch bar 23 is moved to its operative position, the cam face 34, (Fig. 6), of the lug 33 engages the keeper 37 and causes it to ride vertically upward, thereby lifting the lock bar 35 while the moving latch bar 23 continues its movement until the keeper 37 drops into the locking notch 31 to thus lock the bar 23 against return movement. In case any one of the latch bars 23 in the set is in operative position at the time another latch bar is operated, the raising of the lock bar 35 will release that bar and allow it to return to its normal position by the action of a spring pressed plunger 20.

As a means for selecting the setting of predetermined latch bars 23, a selecting cage 40, (Figs. 1 and 5), is provided, formed of side plates 41 and transverse perforated strips 42 arranged in stepped formation for the proper alining of selecting pins 43 with the respective latch bars 23. Thus, in the present construction, each horizontal set of latch bars 23 is longer than the preceding set and the shortest set is the lowermost. Similarly, the sets of selecting pins 43 are successively longer and are arranged in sets respectively in close proximity to the sets of latch bars 23. The arrangement is such that when any one of the selecting pins 43 is elevated above the others in the set row, it will be located directly in front of the latch bar 23 which it is designed to control. The selecting pins 43 have their lower ends of reduced diameter to pass into apertures 44, (Fig. 2), respectively of a registration plate 45, (Figs. 3 and 9), so that the formed shoulders 46 act as a seat to support the pins 43 upon the plate 45. The upper ends of the pins 43 have a sliding fit in the guide apertures 47 of the strips 42, and are held thereby against displacement.

In order to cause the latch bars 23 to be actuated by the selecting pins 43, the cage 40 is mounted to have a limited reciprocating movement, and to that end has each side plate 41, (Fig. 7), secured by a stud 50 to a link 51, which is pivotally connected at 52 to one arm of a pivoted bell crank 53. The other end of the bell crank 53 is positioned in the path of movement of a slidably mounted rod 54, which has its lower end contacting with a cam roller 55 arranged to ride on the face of a cam 56, the high or operating part of which is so designed and located as to reciprocate the rod 54 in timed relation to the cycle of operations. When the rod 54 is raised by the cam 56, the bell crank 53 will be rocked, and thus, through the links 51, shift the cage 40 towards the latch bar cage. This movement of the cage 40 will cause the selecting pins 43 to tilt in the direction of movement of the cage, such tilting action being possible because of the clearance provided by the apertures 44, (Fig. 8), about the reduced ends of the pins 43. In effect this mounting of the pins 43 in enlarged apertures in the fixed plate 45 is a pivotal one and allows for the required movement without disturbing or changing the position of the plate 45. When this movement of the cage takes place any selecting pin 43 which has been raised above the others will strike the end of its latch bar 23 and thus cause the latter to move to the operative position where it is temporarily locked, and consequently the pin selecting cage is free to return to normal position under the action of the coiled spring 48, (Fig. 7), for another selecting operation, without waiting for the cycle of operations, set in motion by the latch bar, to be completed.

As a means for actuating the selecting pins 43, a plurality of operating pins 60 is provided, (Figs. 7 and 9) which are mounted in a pin-box 61, the upper plate 62 of which is perforated so that the upper ends of the pins 60 project a predetermined distance above this plate in order to pass respectively into the apertures 44 of the registration plate 45. These pins 60 are normally held in their projected position by coiled springs 63, which are respectively compressed between collars 64 of the pins and the bottom plate 65 of the pin-box 61. This bottom plate 65 is similarly provided with a plurality of perforations 66, alined with the respective perforations of the upper plate 62, so that the pins 60 are all in parallel relation and free to be individually moved relative to the upper and lower plates 62 and 65. The operating pins 60 are respectively arranged in the pin-box in the same formation as the selecting pins are arranged in the cage 40, and being respectively in register with the apertures in the plate 45 will cause the selecting pins to be lifted when the pin box is moved to advance the operating pin 60 into the registration plate 45. The pin box 60 is mounted to be reciprocated towards and away from the registration plate 45, and to that end is provided with guide bearing sockets 67, fixed to the pin-box and arranged to slide upon fixed tubular guides 68 suspended from the plate 45. These guides 68 internally guide the respective rods 54. The sockets 67 are provided respectively with eccentric straps 70, (Figs. 3 and 7), mounted on eccentrics 71, which are mounted upon a shaft 72, which in this instance also supports the cam 56. A continuous motion is transmitted to the shaft 72 by a worm gear 73 in mesh with the worm 74, (Fig. 2), which is fast to the main driving shaft 75, which receives its power from a motor 76, or any other suitable source of power.

For the purpose of selectively controlling the operating pins 60, cards 77 (Fig. 10) are provided, and arranged to be punched with holes 78 at certain predetermined locations, such holes being of a diameter sufficient to permit the operating pins 60 to pass freely therethrough. These cards 77 are successively fed into position above the pin-box, and a card receiving plate 80, (Figs. 7 and 13), is provided above the pin-box 61 and parallel to and spaced from the registration plate 45 by a distance slightly greater than the thickness of the cards employed. This card plate 80 is provided with perforations 81 corresponding in position and number to the operating pins 60, and therefore has its respective perforations in register with the aperatures 44 of the plate 45. A stop 82 is carried upon the pin-box 61 and rises and falls across the discharge end of the plate 80, whereby as a card reaches its registering position it will engage this stop and thereby be held with its holes 78 properly in register with the perforations 81. When the pin-box lowers, the stop 82 will be removed from the path of the card and the latter may then be discharged. At the card receiving end of the machine the entrance to the card registration space is flared outwardly in order to form a guide which receives the cards from the feeding mechanism and directs each between the plates 45 and 80.

In order to feed the cards successively into their selecting position with respect to the pin-box structure, two superposed feed rolls 84, (Figs. 1 and 15), are located in close proximity to the receiving end of the pin-box, and also have a similar location with respect to the discharge end of a card magazine 85, from which the cards are fed by any suitable mechanism one at a time through the gate 86. Additional driven feed rollers 87 are mounted beneath the card plate 80, and have their upper portions extending through slots in the card plate to contact respectively with idle feed rollers 88, (Figs. 2 and 7), arranged to be frictionally held against the upper surface of the card by springs 89 which determine the pressure exerted upon the card. When the card is held by the operation of the pin-box, these springs will permit the feed rollers 87 to slip and cease feeding the card at that time. At the discharge end of the pin-box are two delivery feed rolls 90, (Figs. 1, 2 and 14), arranged in superposed relation for the card to pass between them, and are so located as to receive the card, remove it from the machine, and deliver it to a card receiving magazine plate 91, slidably mounted in a frame 92, and normally sustained by a coil spring 93. The weight of the cards collected upon the magazine plate 91 causes the spring 93 to gradually collapse and the cards to be stacked in the frame 92. The feed rolls 84 are continuously driven by a gear 94, (Fig. 2), and worm 95, the latter being fixed to the shaft 75, and a similar gear 96 and worm 97, also upon the driving shaft 75, drive the feed rolls 90. The feed rollers 87 are arranged to be driven by worm gearing 98 from the worm 74, heretofore mentioned.

In connection with the cards 77 it will be noted that these are of the type which are divided into separate fields, each of which, in the present form shown by way of example, is numbered from naught to nine, so that each set of numbers in each field corresponds to one set of the pins, and consequently when a number is punched out of the card and the card is in position above the pin-box, this punched hole will permit a certain operating pin to pass through, and the successive pins actuated by that operating pin will cause the proper pin of the stop pins 10 to be set to locate the type-setting bar in the required manner. While generally each of these fields represents certain data which it is wished to compile and tabulate, it is often desirable to identify the data of the card with a specific item or operation, or with respect to an individual responsible for the data. Thus, for example, it may be required to compile and total certain data for which a certain employé in a manufacturing plant is responsible, and for this purpose one of the card fields is selected as the key or designating field, and the numbers punched in that field correspond to the operator's number in the shop. When it is desired to run a set of cards through the machine with a key number designation, it is desirable to have the latch bars 23 for the field of the card in which that number is located continuously set, so that should any other card with a different key designating number enter the machine, the calculating and tabulating mechanism will instantly be caused to give the totals of the cards automatically which have previously passed through the machine. This arrangement will also permit successive stacks of cards of different key numbers to follow automatically in the machine and the totals of each to be tabulated automatically without resetting the latch bar mechanism.

For the purpose of providing a means for setting a key designating combination of the latch bars, there is provided adjacent the latch-bar mechanism a plurality of bell cranks 100, which are pivotally mounted upon a rod 101, (Figs. 1, 1ª and 1ᵇ), and have their free ends respectively in the path of movement of the several lock bars 35. The opposite ends of these bell cranks 100 are connected respectively to pivoted detents 102, each of which is provided with a handle 103 whereby the position of the respective detents may be changed at will from a set position to a non-set position. When these detents are in set position those selected to correspond to the predetermined key designation will be turned from their non-set position as seen in Fig. 1ª to that shown in Fig. 1ᵇ where each will have its end supported upon a transverse fixed bracket 104, which, in the present instance, is provided with slots 104ª to receive the respective detent ends. When so positioned and supported, the lifting of any one of the lock bars 35, by a change in the key designation, will cause the bell crank 100 for the raised lock bar to turn counterclockwise, as shown, to project its detent 102 between a bar 105 and a bail 107ª carried by a reciprocable rod 107. The bar 105 is the actuating end of the total operating lever 106 which is suitably pivoted to transmit motion to the total mechanism. The bar 105 and the bail 107ª extend parallel to the face of the bracket 104 and to each other, being so spaced that the bail 107ª is freely reciprocable without contacting with the bar 105, but when any of the detents 102 take a controlling position, by being projected through the bracket 104, then such detent is between the bail 107ª and the bar 105 so that the rod 107 cannot complete its up stroke without transmitting its movement through the detent to the actuating bar 105. In order to insure the detents being held in controlling position to carry out the desired total initiating movement, each has a shoulder latch 102ª which causes the detent to drop by gravity when its end is projected through its bracket slot and thus latches against the rear wall of the bracket. In this way the raised lock bar 35 is prevented from dropping into the notch 31, and the detent is maintained in the path of the bail 107ª so that the total actuating bar 105 is operated without fail. As soon as the total operating lever 106 has been caused to function and the upward thrust of the bail 107ª has ceased to be exerted against the detent 102 the latter is then pulled back to its set position by the return of its lock bar 35. A manual setting of the detents is then necessary to set them for the change in the key number designation. The rod 107 receives its motion from a rock lever 108, the free end of which straddles and is connected to the cam roller 55, (Fig. 7), in order to be operated in timed relation to the other mechanisms. Normally, all of the detents are swung to inoperative position so that actuation of the respective bell cranks 100 will have no effect upon the totaling mechanism, but when it is desired to total the data of cards bearing a specific key number, the detents corresponding to that particular number in the designating column are thrown to operative position, and consequently the actuation of any other latch bar in the key number field will cause the bell crank 100 controlled thereby to operate, and thus shift the detent into the path of movement of the bar 107, so that the movement of the latter is transmitted by its bail through the detent to the totaling mechanism, which then properly functions automatically. The cam roller 55 is held in contact with the cam 56 by means of a pull spring 109, (Fig. 1), connecting to the lever 108, and also to a fixed part of the frame.

While the totaling mechanism is operating to strike a total for the key number set of cards, the run of which has just been completed, it is essential that the pin selecting and setting mechanism should be rendered ineffective during this short period of time, and to that end a reciprocable rod 110 is provided (Fig. 15), having at one end a comb piece 111, the teeth of which are arranged to straddle the respective printing bars 4 to respectively engage the setting bars 3, so that the latter, during a working stroke of the reciprocable rod 110 will cause all of the setting bars 3 to be rocked away from the frame 11, so that the path of movement of their lugs 14 is removed from the pins 10 when any of the latter are in set position. This action serves to prevent the accounting and totaling mechanism from being disturbed while the total is being automatically struck. The reciprocable rod 110 is attached at its other end to a bell crank 112, (Figs. 1 and 14), pivoted at 113 to a part of the fixed frame, while its other end is in the path of movement of an end of the totaling lever 106, so that whenever the latter is actuated for totaling purposes the bell crank 112 will rock to transmit movement to the rod 110, and thus cause the setting bars 3 to be temporarily removed from the control of the stop pins 10.

Also, during the interval when the total is being struck, it is essential to not only discontinue the feeding of the cards to the pin-box, but also to be sure that the first card of the new key number run of cards does not leave the pin-box before the pins selected by it have actually caused the setting bars of the accounting mechanism to function. These ends are carried out by a mechanism arranged to control the pin-box card stop and also the card feed from the magazine 85, and therefore these two adjuncts will be here more specifically described. The card stop 82 (Figs. 11 and 12) is arranged to slide vertically in an elongated slot in the bottom plate 65 of the pin-box, and is bifurcated to provide fingers 114, which are arranged to pass in stop position above the card plate 80 in order to project into the path of movement of the incoming card. The motion of the pin-box is transmitted to the card stop 82 by means of a lug 115 depending from the pin-box and carrying a stud 116, to which a latch 117 is pivotally attached, the lower end of which is provided with a locking shoulder 118, arranged to engage a laterally extending pin 120 fixed to the lower extremity of the card stop 82. Between the latch 117 and the pin 120 there is a coiled spring 121, which serves to yieldingly hold the pin 120 in locking engagement with the shoulder 118 in locking position of the latch and also to hold the fingers 114 in their upper or card stopping position when the latch 117 is released from engagement with the pin 120. In order to allow for the required relative movement between the card stop 82 and the parts moved by the pin-box, there is a slot 122 provided in the stop 82, and through which the stud 116 passes. Thus, when it is desired to have the card stop follow the movement of the pin-box so that the successive cards can pass through the box, the latch 117 has its shoulder 118 in engagement with the pin 120, and consequently the vertical reciprocation of the lug 115 is transmitted directly to the card stop. When, however, it is necessary to have the card stop held in its upper position to prevent the discharge of the card from the pin-box, the latch 117 is swung to one side to release the pin 120, and in this position the pin-box and its adjuncts are free to reciprocate without transmitting motion to the card stop 82, and this latter is held elevated through the tension of the spring 121. In order to again return the card stop to locking engagement with the latch 117, the upper plate of the pin-box is provided with a re-setting strip 123, which moves in a path to intercept the ends of the fingers 114, and thus carries the card stop downwardly until the pin 120 seats in the latch shoulder 118 by the action of the spring 121. When the card stop 82 is interlocked with the latch, the spacing between the fingers 114 and the re-setting strip 123 is sufficient during the lowering movement of the pin-box to allow the card to pass freely between them during its discharge movement.

In order to successively feed the cards from the magazine 85, the bottom thereof is provided with a reciprocating plate 124, (Fig. 14), having a knife edge 125 at its rear margin, which latter is arranged to remove one card from the stack at each reciprocation of the plate 124. Movement is transmitted to this plate 124 by means of an ear 126 fast to the plate 124 and pivotally connected by a link 127 to a rocker arm 128, which is pivoted at 130 at its lower end to the frame of the machine and carries a pin 131. A lever 132 extends transversely to the arm 128 and is provided with a notch 133, which in normal position of the lever 132 fits snugly about the pin 131, and a spring 134 extends between the end of the lever 132 and a fixed part of the frame in order to hold the lever in the aforesaid normal position. On the opposite side of the pin 131 from the spring 134 the lever 132 is pivotally attached at 135 to the strap 136 of an eccentric 137, which is keyed to the shaft 72 below and substantially opposite the central portion of the pin-box structure, (Fig. 3). Beyond the fulcrum 135, (Fig. 14), of the lever 132 the latter terminates in an extension 138, which is located in the path of movement of a trip bar 140, this latter also being provided with a trip lug 141 which is arranged in its path of movement to intercept a trip finger 142 of the latch 117.

In order to operate the trip bar 140 in proper timed relation with the totaling step, the total operating lever 106 is connected to a link 143 joined to a bell crank 144, pivotally mounted at 145 on a fixed bracket 146, and having its opposite arm pivotally connected to the trip bar 140. Thus, at the completion of a key number run of cards, the operation of the total operating lever 106 causes the trip bar 140 to be projected in a direction to bring its end into engagement with the extension 138 of the lever 132, which is thereupon rocked upon its fulcrum 135 so that the notch 133 is removed from the pin 131 to thereby disconnect the operating mechanism from the card feeding mechanism. Simultaneously with this action, the lug 141 of the trip bar 140 picks up the trip finger 142 of the latch 117, and thereby releases the card stop from the pin-box actuating mechanism so that it remains in its upper or stopping position during the totaling operation.

The operation of the machine is as follows: A stack of cards 77, punched in a predetermined manner with the data to be compiled, are placed in the card magazine 85, from which they are fed, one at a time, through the gate 86 to the feed rolls 87, and thence to proper registration position between the card plate 80 and the registration plate 45. The timing of the eccentrics 71 is such that as the card takes its registered position the pin-box begins its up stroke, and consequently those operating pins 60 which are in register with the punched holes 78 in the card pass through the card and into the registration plate 45, while all the other operating pins 60 are pushed back by the card against the tension of their springs 63. Those pins which enter the registration plate 45 raise the corresponding selecting pins 43, and cause each to take a position in close proximity to the ends of the respective latch bars 23 which are controlled by those particular selecting pins. When this has taken place, the cam 56 has reached a position where its high side raises the rod 54, and thereby causes the pin selecting cage 40 to move toward the latch bar mechanism, and thereby impart a tilting of the pins with respect to their supporting plate 45. This movement of the pin cage 40 is sufficient to shift all of the selective latch bars 23 a sufficient distance to cause the lock bars of these latch bars to be raised by the respective cam lugs 33 and bring the locking notches 31 beneath the keepers 37, so that the lock bar drops to the position to lock the latch bars in their set positions. Simultaneously with this action the moving latch bars shift the corresponding plungers 20 to cause the stop pins 14 to be projected into the path of the type setting bars 3, so that when these setting bars 3 are actuated the accounting mechanism of the machine is operated in the manner determined by the punched holes of the card.

As soon as the latch bars 23 are locked in position, the continuously rotating cam 56 has reached a position to return the cage 40 by tension of spring 48 to its normal position and the eccentric 71 to lower the pin-box so that the tabulated card can be promptly fed out of the machine by the feed rolls 87 and 90 and delivered to the stacking frame 91 while the next card is being fed into position for tabulation. It will be apparent that the pin selecting mechanism is not idle while the accounting and printing cycle is being automatically completed, but, to the contrary, immediately resumes its cycle while the latch bars and associated parts are set for the accounting cycle, and in this way it is possible to materially reduce the time of the operation of the machine and permit a greater number of cards to be fed through the machine in a given time than has heretofore been possible.

Where a key number run of cards is made, those lock bars 35 corresponding to the key number field have their bell crank detents 102 swung to and located in a position where the raising of any one of the lock bars by a digit other than that of the key number will cause its detent to be shifted between the end of the rod 107 and the actuating bar 105 of the total lever 106, and thereby cause the latter to be actuated to strike a total of the data then upon the accounting section.

The actuation of the total lever 106 in a counter-clockwise direction causes the bell crank 112 to advance the comb 111 to a position where it shifts and holds the setting bars 3 entirely removed from the path of the setting pins 10. This insures the proper function of the totaling mechanism without interference from any of the associated parts of the card selecting mechanism. Also, the counter-clockwise movement of the lever 106 raises the link 143, and transmits movement by way of bell crank 144 to the trip bar 140, which is then projected in the required direction to intercept and press down the extension 138 of the lever 132, which action causes this lever 132 to be tilted so that its notch 133 is removed from the pin 131 and thereby disconnects the arm 128 so that the card feeding plate 124 ceases to reciprocate. The movement of the trip bar 140 also causes the trip lug 141 to pick up the trip finger 142 of the latch 117, and move it in a direction so that the latch 117 is disengaged from the pin 120 on the lower projecting portion of the card stop 82. Thus, as soon as the total operating lever 106 is operated, and during the period of the totaling operation, the setting bar mechanism of the machine is disconnected from its operating mechanism, and simultaneously the card feeding mechanism is rendered ineffective, and any card which is then in the pin-box is caused to remain in its selecting position until the feeding of the cards is again resumed automatically at the completion of the totaling operation.

From the foregoing, it will be apparent that a complete unitary selecting device for accounting and printing mechanisms has been devised wherein there are separate and distinct units for the selecting and operating operations, any one of which can be readily removed and replaced without unnecessarily disassembling the machine. This is particularly advantageous where the card data is so changed as to require a rearrangement of the plunger units 20 or the selecting pins of the cage 22 and pin-box 61.

Also attention is directed to the construction which permits separate functioning of the accounting mechanism and the selecting mechanism because it is by such construction that a greater number of cards can be run through the machine than has heretofore been possible in the same interval of time. This is accomplished by providing a continuously reciprocating selecting mechanism which after it has completed a selecting operation begins a new selecting cycle while simultaneously the accounting mechanism is proceeding with its cycle as set by the selecting operation. In other words, the selecting mechanism does not remain at rest while the accounting cycle is being carried out but to the contrary is beginning the next successive selecting cycle, and the fraction of time heretofore lost while the accounting mechanism functions is utilized to discharge one card, bring in another card, and make a pin selection, all in timed relation to the movements of the accounting sections.

Furthermore, it should be noted that the selecting mechanism as here shown embodies selecting pins which are set respectively to selecting position by moving them axially, but the actual selecting and operating of the latch bars is carried out by moving the pins laterally or transverse to the line of axial movement. This construction greatly simplifies the operating adjuncts of the selecting mechanism and eliminates a large number of motion transmitting parts heretofore required.

Although but one form is shown in which this invention may be embodied, it is to be understood that the invention is not limited to any specific construction, but might be applied in various forms without departing from the spirit of the invention or the scope of the appended claims.

Having thus described my invention, I claim:

1. In a machine of the character stated, an accounting mechanism, means to cause said mechanism to be actuated in a predetermined manner, a card controlled selecting mechanism arranged to control said actuating means, and means to lock said actuating means in its set position after a selecting operation whereby said selecting mechanism is ready to begin a second selecting operation upon a second card before the accounting mechanism cycle is completed upon the first card.

2. In a machine of the character stated, an accounting mechanism, means to cause said mechanism to be actuated in a predetermined manner, a selecting mechanism arranged to control said actuating means, and means to lock said actuating means in a set position until the succeeding selecting operation of said selecting mechanism is completed.

3. In a machine of the character stated, an accounting mechanism, means to cause said mechanism to be actuated in a predetermined manner, a card controlled selecting mechanism arranged to control said actuating means, and means to lock said actuating means in a set position while said selecting mechanism is moving upon a succeeding selecting operation upon a different card.

4. In a machine of the character stated the combination of an accounting mechanism, a selective control means for said accounting mechanism, a device including a plurality of latch bars for operating said control means, a card controlled selecting mechanism for selectively actuating said latch bars, and means automatically operable for locking all of said latch bars and simultaneously locking any latch bars set by said selecting mechanism.

5. In a machine of the character stated the combination of an accounting mechanism, a selective control means for said accounting mechanism, a device including a plurality of latch bars for operating said control means, a card controlled selecting mechanism for selectively actuating said latch bars, means automatically operable for locking all of said latch bars and simultaneously locking any latch bars set by said selecting mechanism, and means for automatically releasing said locking means.

6. In a machine of the character stated the combination of an accounting mechanism, a selective control means for said accounting mechanism, a card controlled pin-box structure, means interposed between said pin-box structure and said control means for selectively actuating said control means, and means to lock said control means after being selectively set whereby said pin-box structure and said selective actuating means are free to perform a second selecting cycle while said accounting mechanism cycle is being completed.

7. In a machine of the character stated the combination of an accounting mechanism, a selective control means for said accounting mechanism, a card controlled pin-box structure, means for reciprocating said pin-box structure, means interposed between said control means and said pin-box structure and operated by the latter for selectively actuating said control means, and means to lock said control means after being selectively set whereby said pin-box structure and said selective actuating means are free to perform a second selecting cycle while said accounting mechanism cycle is being completed.

8. In a machine of the character stated the combination of an accounting mechanism, a selective control means for said accounting mechanism, a card controlled pin-box structure, means for reciprocating said pin-box structure, means including a plurality of axially and laterally movable pins interposed between said pin-box structure and said control means for selectively actuating said control means, said pins being selectively operated axially by said pin-box structure, and means for shifting said pins laterally to actuate said control means.

9. In a machine of the character stated the combination of an accounting mechanism, a selective control means for said accounting mechanism, a pin-box structure including a plurality of pins arranged to be controlled by a card punched in a predetermined manner, a plurality of selecting pins operatively arranged with respect to said pin-box pins and respectively alined therewith and also operatively arranged with respect to said control means, means to move said pin-box structure to cause certain selecting pins to be moved axially, and means to move said selecting pins laterally towards said control means whereby the axially moved pins coact with said control means to cause said control means to function in a predetermined manner.

10. In a machine of the character stated the combination of an accounting mechanism, a selective control means for said accounting mechanism, a pin-box structure including a plurality of pins arranged to be controlled by a card punched in a predetermined manner, a plurality of selecting pins operatively arranged with respect to said pin-box pins and respectively alined therewith and also operatively arranged with respect to said control means, means to move said pin-box structure to cause certain selecting pins to be moved axially, and automatic means operating in timed relation with respect to said pin-box to move said selecting pins laterally towards said control means whereby the axially moved pins coact with said control means to cause said control means to function in a predetermined manner.

11. In a machine of the character stated the combination of an accounting mechanism, a selective control means for said accounting mechanism, a pin-box structure including a plurality of pins arranged to be controlled by a card punched in a predetermined manner, a plurality of selecting pins operatively arranged with respect to said pin-box pins and respectively alined therewith and also operatively arranged with respect to said control means, means to move said pin-box structure to cause certain selecting pins to be moved axially, and cam controlled automatic means operating in timed relation with respect to said pin-box to move said selecting pins laterally towards said control means whereby the axially moved pins coact with said control means to cause said control means to function in a predetermined manner.

12. In a machine of the character stated, a selecting mechanism comprising a fixed plate, a frame slidably mounted on said plate, a plurality of pins mounted to move axially in said frame and supported by said plate for movement laterally thereon, a card controlled pin mechanism for selectively causing said pins to move axially, and means for moving said frame to shift said pins laterally.

13. In a machine of the character stated, a selecting mechanism comprising a plurality of pins mounted to move axially for a selecting operation and to have a tilting movement for an actuating operation.

14. In a machine of the character stated, a selecting mechanism comprising a fixed plate having a plurality of holes therethrough, a plurality of pins having ends respectively in said holes and freely movable axially and transversely of said holes, and a frame movable relative to said plate and supporting the opposite ends of the respective pins for sliding axial movement, whereby said pins are arranged to be moved axially relative to said frame for a selecting operation and to move laterally with said frame for an actuating operation.

15. In a machine of the character stated, a key designating device for cards having the same key designation, comprising in combination a bar for operating a totaling mechanism automatically, a member movably mounted adjacent thereto, a plurality of locking bars, a series of latch bars controlled by each locking bar, and means automatically positioned by said locking bars to transmit motion from said operating bar to said totaling bar when any latch bar other than a predetermined key designated latch bar is operated.

16. In a machine of the character stated, a key designating device arranged to be set to respond to cards having the same predetermined key designation, a totaling mechanism, card controlled selecting and setting mechanisms, means for feeding cards to said selecting mechanism, means rendered operative by a card having a key designation differing from said predetermined key designation for causing said totaling mechanism to automatically function, a card stop, means normally moving said stop into and out of the path of a card, means for releasing said stop from said moving means when said totaling mechanism is functioning, and means for holding said stop in the path of a card when said stop is released.

17. In a machine of the character stated, a key designating device arranged to be set to respond to cards having the same predetermined key designation, a totaling mechanism, card controlled selecting and setting mechanisms, means for feeding cards to said selecting mechanism, means rendered operative by a card having a key designation differing from said predetermined key designation for causing said totaling mechanism to automatically function, a card stop, means normally moving said stop into and out of the path of a card, means operated by said total operating means for releasing said stop from said moving means, and means for holding said stop in the path of a card when said stop is released.

18. In a machine of the character stated, a key designating device arranged to be set to respond to cards having the same predetermined key designation, a totaling mechanism, card controlled selecting and setting mechanisms, means for feeding cards to said selecting mechanism, means rendered operative by a card having a key designation differing from said predetermined key designation for causing said totaling mechanism to automatically function, a card stop, means normally moving said stop into and out of the path of a card, means operated by said total operating means for releasing said stop from said moving means, means for holding said stop in the path of a card when said stop is released, and means for reestablishing connection between said stop and moving means at the end of said totaling operation.

19. In a machine of the character stated, a card supporting means, a reciprocable pin-box arranged to coact with a card on said supporting means, a card stop normally connected to move with said pin-box into and out of the path of movement of a card on said supporting means, and means to automatically release said card stop at a predetermined time to leave said stop in the path of a card while said pin-box moves independently thereof.

20. In a machine of the character stated, a card supporting means, a reciprocable pin-box arranged to coact with a card on said supporting means, a card stop normally connected to move with said pin-box into and out of the path of movement of a card on said supporting means, means to automatically release said card stop at a predetermined time to leave said stop in the path of a card while said pin-box moves independently thereof, and means to reconnect said card stop to said pin-box at a predetermined time.

21. In a machine of the character stated, a card supporting means, a reciprocable pin-box arranged to coact with a card on said supporting means, a card stop mounted independent of said pin-box, a pivoted latch mounted to move with said pin-box, a lug on said card stop arranged to be engaged by said latch to cause said stop to move with said pin-box, a spring between said latch and said lug, and means for automatically releasing said latch to disconnect said stop from said pin-box at a predetermined time.

22. In a machine of the character stated, a card supporting means, a reciprocable pin-box arranged to coact with a card on said supporting means, a card stop mounted independent of said pin-box, a pivoted latch mounted to move with said pin-box, a lug on said card stop arranged to be engaged by said latch to cause said stop to move with said pin-box, a spring between said latch and said lug, and means for automatically releasing said latch when the totaling mechanism of said machine is actuated.

Signed at Brooklyn, county of Kings, State of New York, this 8th day of October, 1923.

WILLIAM W. LASKER.